United States Patent [19]
Strand et al.

[11] Patent Number: 5,846,694
[45] Date of Patent: Dec. 8, 1998

[54] MICROMINIATURE OPTICAL WAVEGUIDE STRUCTURE AND METHOD FOR FABRICATION

[75] Inventors: Oliver T. Strand, Castro Valley; Robert J. Deri, Pleasanton; Michael D. Pocha, Livermore, all of Calif.

[73] Assignee: The Regents of the University of California, Oakland, Calif.

[21] Appl. No.: 600,571

[22] Filed: Feb. 13, 1996

[51] Int. Cl.⁶ .................................................. G03C 5/00
[52] U.S. Cl. ........................ 430/321; 430/330; 385/35
[58] Field of Search ................................. 430/321, 330; 385/35

[56] References Cited

U.S. PATENT DOCUMENTS

| | | | |
|---|---|---|---|
| 5,064,266 | 11/1991 | Sun et al. | 385/132 |
| 5,246,733 | 9/1993 | Springer et al. | 216/67 |
| 5,439,782 | 8/1995 | Haemmerle et al. | 430/321 |
| 5,499,312 | 3/1996 | Hahn et al. | 385/91 |

OTHER PUBLICATIONS

R. R. A. Syms and A. S. Holmes, Reflow and Burial of Channel Waveguides Formed in Sol–Gel Glass on Si Substrates, IEEE Photonics Technology Letters, vol. 5, No. 9, pp. 1077–1079, Sep. 1993.

C. J. Sun, et al., Silica Based Circular Cross–Sectioned Channel Waveguides, IEEE Photonics Technology Letters, vol. 3, No. 3, pp. 238–240, Mar. 1991.

H. Izadpanah and L. A. Reith, Microlens fabrication technique for an efficient laser/single–mode fiber coupling, SPIE vol. 836 Optoelectronic Materials, Devices, Packaging, and Interconnects, pp. 306–310 (1987).

L. F. Miller, Controlled Collapse Reflow Chip Joining, IBM J. Res. Develop., pp. 239–250, May 1969.

L. S. Goldmann and P. A. Totta, Area Array Solder Interconnections for VLSI, Solid State Technology, pp. 91–97, Jun. 1983.

*Primary Examiner*—Mark A. Chapman
*Attorney, Agent, or Firm*—Daryl S. Grzybicki

[57] ABSTRACT

A method for manufacturing low-cost, nearly circular cross section waveguides comprises starting with a substrate material that a molten waveguide material can not wet or coat. A thin layer is deposited of an opposite material that the molten waveguide material will wet and is patterned to describe the desired surface-contact path pedestals for a waveguide. A waveguide material, e.g., polymer or doped silica, is deposited. A resist material is deposited and unwanted excess is removed to form pattern masks. The waveguide material is etched away to form waveguide precursors and the masks are removed. Heat is applied to reflow the waveguide precursors into near-circular cross-section waveguides that sit atop the pedestals. The waveguide material naturally forms nearly circular cross sections due to the surface tension effects. After cooling, the waveguides will maintain the round shape. If the width and length are the same, then spherical ball lenses are formed. Alternatively, the pedestals can be patterned to taper along their lengths on the surface of the substrate. This will cause the waveguides to assume a conical taper after reflowing by heat.

14 Claims, 5 Drawing Sheets

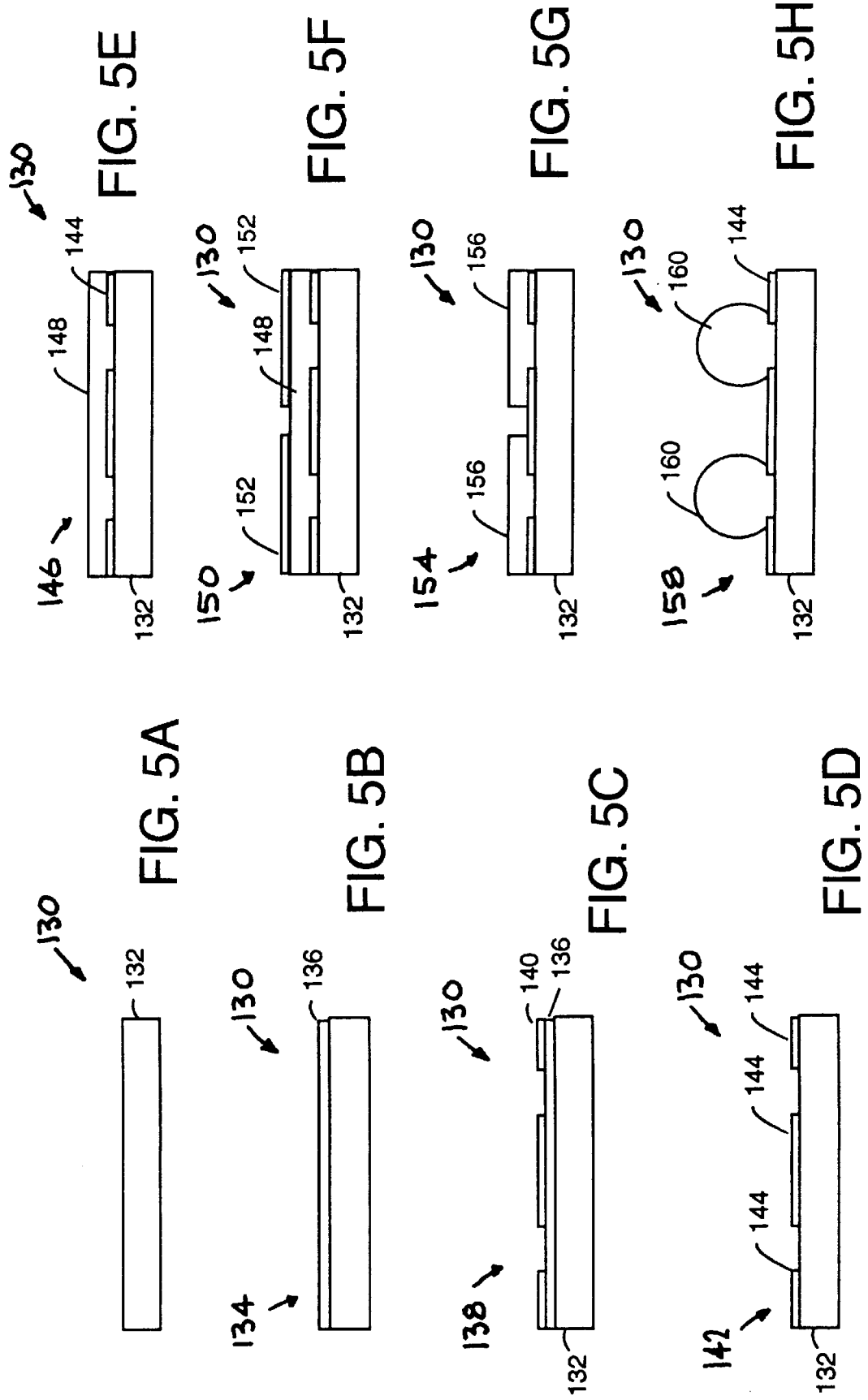

MICROMINIATURE OPTICAL WAVEGUIDE STRUCTURE AND METHOD FOR FABRICATION

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to microstructures and their fabrication and more particularly to fabricating ball lenses and tapered and untapered optical waveguides with circular cross-sections on substrates like silicon wafers.

2. Description of Related Art

Future communication and information technologies are expected to strain the present-day capabilities of electronic circuit architectures and fabrication methods. Even today, optoelectronic (OE) devices, such as laser diodes and modulators, have much higher information-carrying capacities than their electronic counterparts. Wire conductors have limited electrical signal speeds. In contrast, fiber optics and waveguides can carry optical signals at rates that are many orders of magnitude faster. Therefore, considerable interest has been generated in developing photonics technology to replace electronic components with optoelectronic components. In particular, many present-day semiconductor integrated circuits are expected to be superseded by optoelectronic integrated circuits (OEICS) that include optoelectronic devices in very small packages that are interconnected by optical waveguides.

Conventional methods for building optical waveguides use either polymer or doped silica waveguide materials. Polymer waveguides are built by coating and selective etching, inducing external dopant diffusion, molecularly orientating constituents and/or dopants, and reacting with internal polymerization-driven diffusion without dopants. Silica-based waveguides are typically fabricated by etching rib geometries or v-grooves, back-filling with silica, etching sol-gel ribs, reflowing and burying.

The "Reflow and Burial of Channel Waveguides Formed in Sol-Gel Glass on Si Substrates" is discussed by R. R. A. Syms and A. S. Holmes in IEEE Photonics Technology Letters, Vol. 5, No. 9, September 1993, pp. 1077–1079. Ridge waveguides are formed by etching and then heated in a furnace to reflow both core and buffer layers to make a smooth layer for burial by further spin-coat deposition.

L. F. Miller describes "Controlled Collapse Reflow Chip Joining" in the May 1969 issue of IBM J. Res. Develop., pp. 239–250. The surface tension in a molten pad and land solder is used to support a device during solder reflow until a joint solidifies.

A "Microlens fabrication method for an efficient laser/single-mode fiber coupling" is described by H. Izadpanah and L. A. Reith, in SPIE Vol. 836, Optoelectronic Materials, Devices, Packaging, and Interconnects (1987), pp. 306–310. A microlens is formed by etching a single-mode fiber until only a whisker of pure core material remains. Surface tension in an acid/oil interface is used to etch the fiber in a taper. The tapered end is then cut and arc-melted back to form a lens of the proper radius for optimal laser-to-single-mode fiber coupling.

"Silica-Based Circular Cross-Sectioned Channel Waveguides" are discussed by C. J. Sun, et al., in IEEE Photonics Technology Letters, Vol. 3, No. 3, March 1991, pp. 238–240. Regular rectangular cross-sectioned channel waveguides are first fabricated with flame hydrolysis deposition and then reactive-ion etched. The waveguide core layer is doped, and a selective wet etching and heat treatment is used to round the rectangular cross-sections. The underlying cladding is etched faster than the core due to selective etching. A thin over-cladding is then sputtered on.

Such prior art materials and methods have corresponding advantages and disadvantages. The etching rib geometries method for polymers is simple and inexpensive but results in rectangular-shaped waveguides with vertical dimensions that cannot be easily controlled. Other methods for shaping polymers into waveguides are complicated and expensive. Methods that use silica to build waveguides also generally result in rectangular cross sections with uniform, invariant vertical dimensions. Tapered waveguides built with these methods usually taper in their lateral dimension, not in their thickness, as would a circular cross section cone. Prior art methods for making waveguides with tapers in two dimensions, or for making passive components such as lenses, are rare. But being able to fabricate waveguide tapers and lenses easily is critical to increasing the coupling efficiency between waveguides, laser diodes and other OE devices. The ability to form tapers and lenses is important in avoiding stringent alignment criteria which, ultimately, reduce OEIC packaging costs.

Haemmerle, et al., describe in U.S. Pat. No. 5,439,782, issued Aug. 8, 1995, various methods for making microstructures, e.g., tapered optical waveguides. A polymer layer with a uniform thickness and a tapered width is deposited on a glass substrate. The polymer layer is then made to taper in thickness too, e.g., by heating the polymer to soften and redistribute itself. The polymer material is chosen to be one that does not wet the substrate material so that during the heating the polymer layer does not flow on the areas of the substrate that were not previously covered by the polymer layer. The polymer is then hardened, e.g., by cooling. Reactive-ion etching is then used to replicate the hardened polymer structure in the glass substrate. The rate of etching is uniform, so the hump of tapered polymer spatially delays the time when the etch punches through everywhere and attacks the glass underneath. The shaped polymer layer is thus completely sacrificed in the etching and the tapered shape is duplicated in the etched glass. The tapered optical waveguide is ultimately comprised only of the etched glass, preferably a high refractive index glass. Water is suggested as a surfactant layer to control wetting of a photoresist substituted for the polymer layer.

SUMMARY OF THE INVENTION

An object of the present invention is to provide a method for making optical waveguides.

Another object of the present invention is to provide a method for the microminiature fabrication of spherical ball lenses.

A further object of the present invention is to provide a method for the microminiature fabrication of optical waveguides.

A still further object of the present invention is to provide a method for the microminiature fabrication of tapered optical waveguides with circular cross-sections.

Briefly, a method embodiment of the present invention for manufacturing low-cost, nearly circular cross section waveguides comprises starting with a substrate material that a molten waveguide material cannot wet or coat. A thin layer is deposited of an opposite material that the molten waveguide material will wet and is patterned to describe the desired surface-contact path pedestals for a waveguide. A waveguide material, e.g., polymer or doped silica, is deposited. A resist material is deposited and unwanted excess is removed to form pattern masks. The waveguide material is etched away to form waveguide precursors and the masks are removed. Heat is applied to reflow the waveguide precursors into near-circular cross-section waveguides that sit atop the pedestals. The waveguide material naturally forms nearly circular cross sections due to the surface tension effects. After cooling, the waveguides will maintain the round shape. Alternatively, the pedestals can be patterned to taper along their lengths on the surface of the substrate. This will cause the waveguides to assume a conical taper after reflowing by heat.

An advantage of the present invention is that a method is provided for fabricating optical waveguides with round cross sections on substrates.

A further advantage of the present invention is that a method is provided for fabricating spherical ball lenses on substrates.

Another advantage of the present invention is that a method is provided for fabricating tapered optical waveguides with round cross sections on substrates.

BRIEF DESCRIPTION OF THE DRAWINGS

FIGS. 5A–5H diagram the processing steps of a fifth method embodiment of the present invention for fabricating optical waveguides on substrates.

DETAILED DESCRIPTION OF THE INVENTION

Figure 1A:
FIGS. 1A–1F diagram the processing steps of a first method embodiment of the present invention for fabricating optical waveguides on substrates.
Figure 1B:
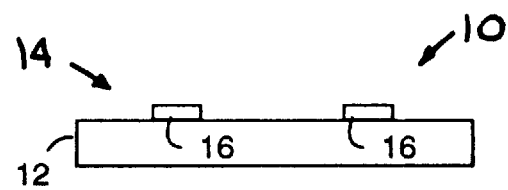
Figure 1C:
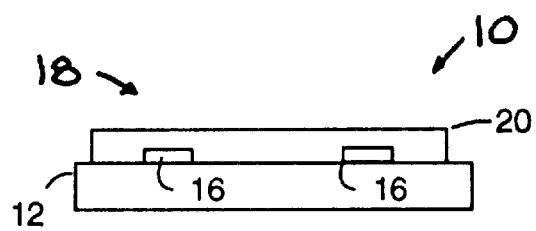
Figure 1D:
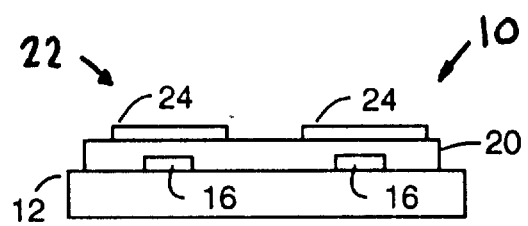
Figure 1E:
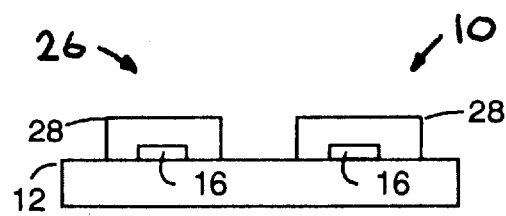
Figure 1F:
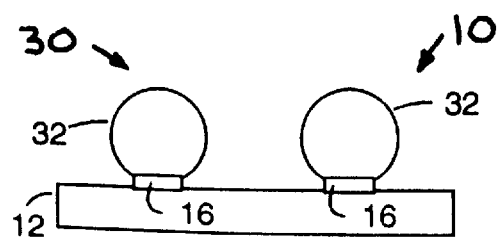

FIGS. 1A–1F illustrate a first method embodiment of the present invention for manufacturing low-cost, nearly circular cross section waveguides, referred to herein by the general reference numeral 10. The method 10 starts with a substrate material 12 that a molten waveguide material cannot wet or coat. In a step 14, a thin layer is deposited of an opposite material that the molten waveguide material will wet, and that is patterned to describe the desired surface-contact path pedestals 16 for a waveguide. In a step 18, a waveguide material 20, e.g., polymer or doped silica, is deposited. In a step 22, a resist material is deposited and unwanted excess is removed to form pattern masks 24. In a step 26, the waveguide material is etched away to form waveguide precursors 28 and the masks 24 are removed. In a step 30, heat is applied to reflow the waveguide precursors 28 into near-circular cross-section waveguides 32 that sit atop pedestals 16. The waveguide material will naturally form nearly circular cross sections due to the surface tension effects. After cooling, the waveguides will maintain the proper shape. Alternatively, the pedestals 16 can be patterned to taper along their lengths on the surface of the substrate 12. This will cause the waveguides 32 to assume a conical taper after the step 30 of reflowing by heat.

Figure 2A:
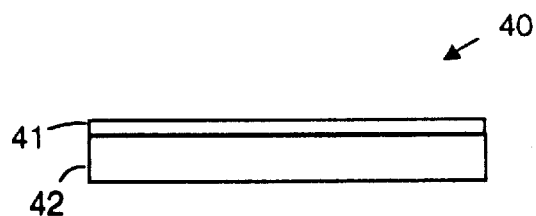
FIGS. 2A–2F diagram the processing steps of a second method embodiment of the present invention for fabricating optical waveguides on substrates.
Figure 2B:
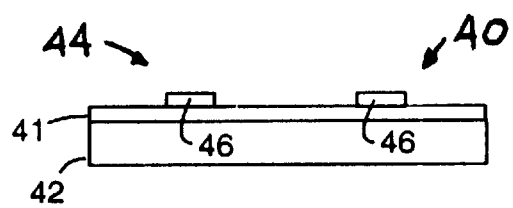
Figure 2C:
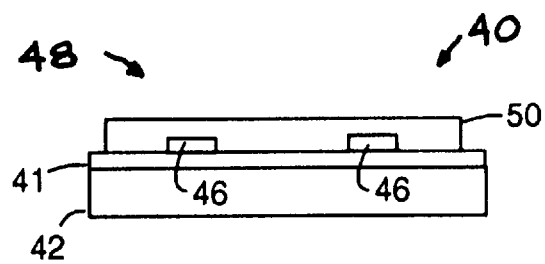
Figure 2D:
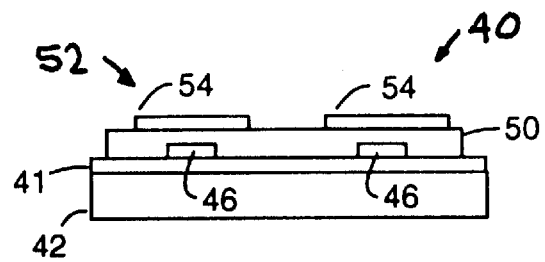
Figure 2E:
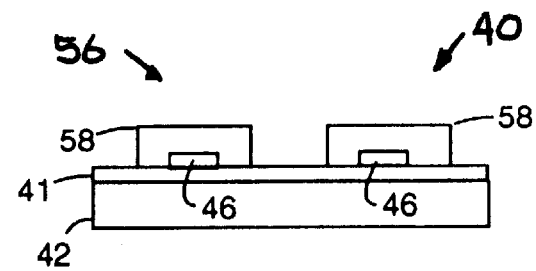
Figure 2F:
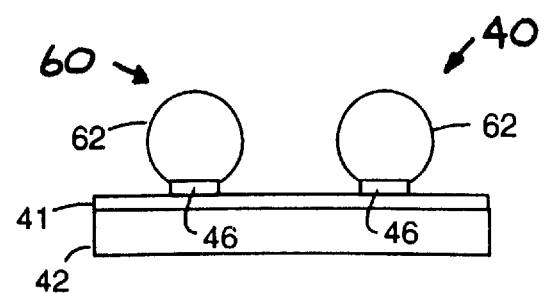

FIGS. 2A–2F illustrate a second method embodiment of the present invention for manufacturing low-cost, nearly circular cross section waveguides, referred to herein by the general reference numeral 40. The method 40 starts with a substrate material 42 that a molten waveguide material will wet covered by a layer 41 of material that the molten waveguide material cannot wet. In a step 44, a layer is deposited of an opposite material that the molten waveguide material will wet. The wettable layer is patterned to form pedestals 46 along a desired surface-contact path for a waveguide. In a step 48, a waveguide material 50, e.g., polymer or doped silica, is deposited. In a step 52, a resist material is deposited and unwanted excess is removed to form pattern masks 54. In a step 56, the waveguide material is etched away to form waveguide precursors 58 and the masks 54 are removed. In a step 60, heat is applied to reflow the waveguide precursors 58 into near-circular cross-section waveguides 62 that sit atop pedestals 46. The waveguide material will naturally form nearly circular cross sections due to the surface tension effects. After cooling, the waveguides will maintain the proper shape. Alternatively, the pedestals 46 can be patterned to taper along their lengths on the surface of the substrate 42. This will cause the waveguides 62 to assume a conical taper after the step 30 of reflowing by heat.

Figure 3A:
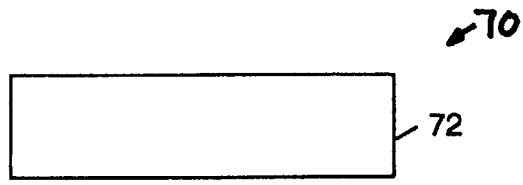
FIGS. 3A–3F diagram the processing steps of a third method embodiment of the present invention for fabricating optical waveguides on substrates.
Figure 3B:
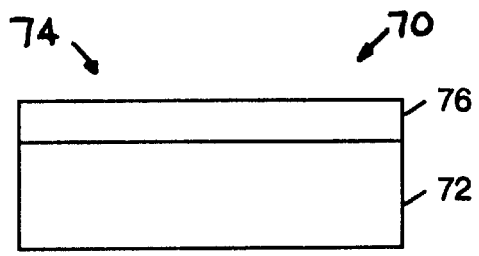
Figure 3C:
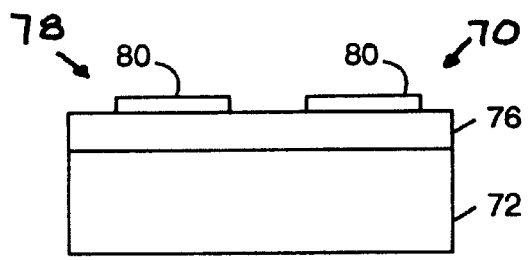
Figure 3D:
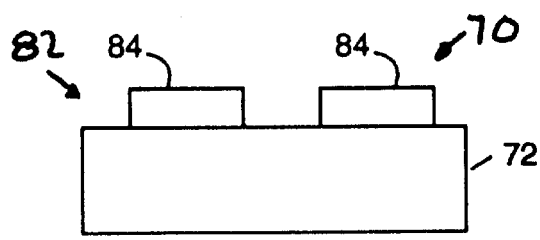
Figure 3E:
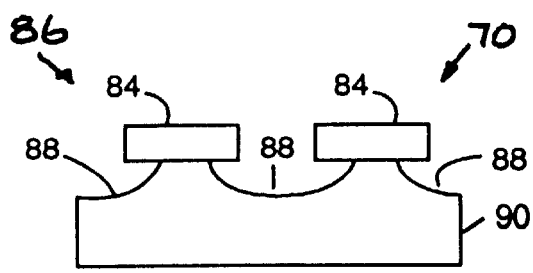
Figure 3F:
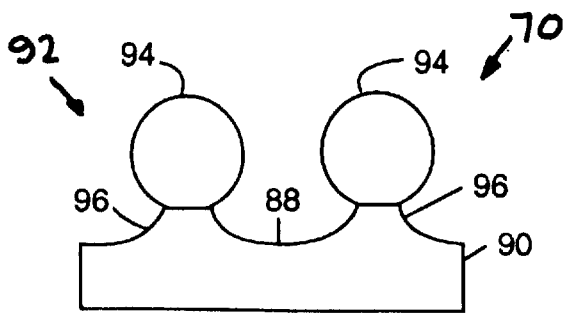

FIGS. 3A–3F illustrate a third method embodiment of the present invention for manufacturing low-cost, nearly circular cross section waveguides, referred to herein by the general reference numeral 70. The method 70 starts with a substrate material 72 that a molten waveguide material will wet. In a step 74, a layer 76 of waveguide material, e.g., polymer or doped silica, is deposited. In a step 78, a resist is deposited and patterned into a set of masks 80 that extend along surface paths where waveguides are desired. In a step 82 the portions of the waveguide layer 76 that were not protected by the masks 80 are etched away and the masks 80 are removed thus leaving waveguide precursors 84. In a step 86, the waveguide precursors 84 themselves are used as masks while etching troughs 88 in the substrate 72 to form a trenched substrate 90. Such an etch is allowed to eat away at the substrate itself for a predetermined amount of time so that the substrate 72 is partially etched away from beneath the waveguide precursors 84. In a step 92, heat is applied to reflow the waveguide precursors 84 into near-circular cross-section waveguides 94 that sit atop pedestals 96. The waveguide material will naturally form nearly circular cross sections due to surface tension effects. The substrate 90 may need to be held upside down during the heating step 92 to prevent molten waveguide precursor 84 from flowing over the entire substrate surface. After cooling, the waveguides 94 will maintain the rounded shape. Alternatively, the masks 80 can be patterned to taper along their lengths on the surface of the waveguide layer 76. This will cause the waveguides 94 to assume a conical taper after the step 92 of reflowing by heat.

Figure 4A:
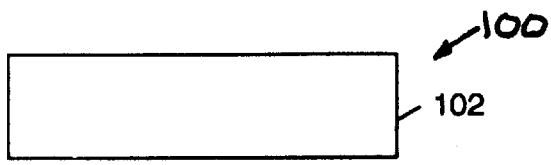
FIGS. 4A–4F diagram the processing steps of a fourth method embodiment of the present invention for fabricating optical waveguides on substrates.
Figure 4B:
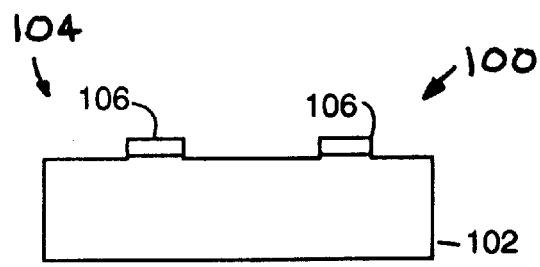
Figure 4C:
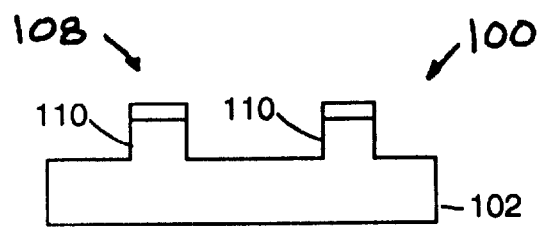
Figure 4D:
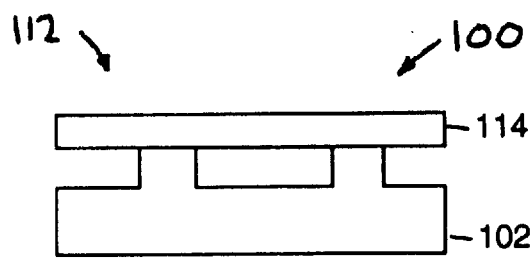
Figure 4E:
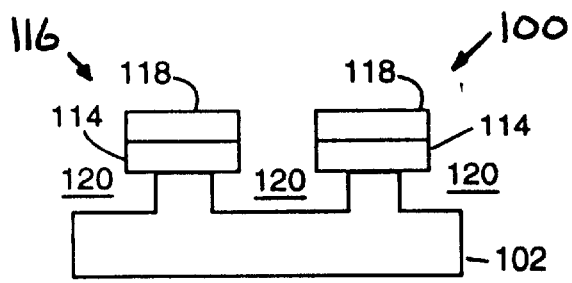
Figure 4F:
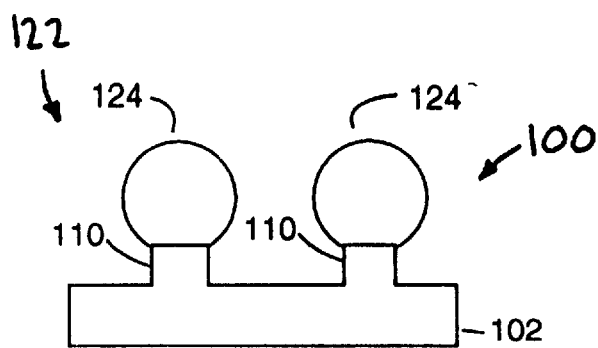

FIGS. 4A–4F illustrate the processing steps of a fourth method embodiment of the present invention for fabricating circular cross section waveguides on substrates, referred to herein by the general reference numeral 100. The method 100 starts with a substrate 102. A step 104 applies a set of masks 106 to define the ultimate location for a corresponding set of waveguides. A step 108 etches the substrate 102 down to form a set of pedestals 110. A step 112 is used to remove the masks 106 and to attach a layer 114 of waveguide material by anodic or thermal bonding, or by using an adhesive. The height and surface dimensions of the pedestals 110 are independently controlled by photolithography and etching. In a step 116, a mask 118 is applied to the top surface of the waveguide material 114 and unwanted waveguide material is etched away leaving a plurality of voids 120. In a step 122, the masks are removed and the remaining waveguide material 114 is reflowed to form a plurality of nearly circular waveguides or ball lenses 124. The exact alignment of the mask 118 used for etching the waveguide material 114 is not critical, because the waveguides will self-align to the pedestals during the heat of reflow.

FIGS. 5A–5H illustrate the processing steps of a fifth method embodiment of the present invention for fabricating ball lenses and waveguides on substrates, referred to herein by the general reference numeral 130. The method 130 starts with a wettable substrate 132. A step 134 applies a coat 136 of non-wettable material. A step 138 applies a pattern of masks 140. A step 142 is used to etch the coat 136 and to remove the masks 140, leaving a non-wettable material pattern 144 that will define the ultimate routing of the waveguide. In a step 146, a waveguide material 148 is applied. A step 150 applies a pattern of masks 152. A short dead ended route with define a ball lens. A step 154 etches away the waveguide material 148 not protected by the masks 152 and leaves a waveguide precursor 156 after the masks 152 are washed away. A step 158 reflows the waveguide precursors 156 and forms circular cross section waveguides or ball lenses 160.

Generally in all five methods 10, 40, 70, 100 and 130, it is important to select a waveguide material that has a melting point that is lower than the other materials used, e.g., so that only the waveguide reflows when the heat is applied.

The waveguides built by the methods described above need not be straight sections but could also be curved sections of waveguides. Each method may also be used to manufacture a variety of passive optoelectronic waveguide components, including, but not limited to, Y-junctions, star couplers, two-dimensional tapers, and ball lenses. The reflow process naturally forms convex shapes on the ends of the waveguides which aid in focusing light into the waveguide. The construction of ball lenses is similar to reflowing solder for bump-bonding of electronic components.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for manufacturing low-cost, nearly circular cross section waveguides, the method comprises the steps of:
    starting with a substrate material that a molten waveguide material cannot wet or coat;
    depositing a thin layer of material that said molten waveguide material will wet and patterning to describe a desired surface-contact-path pedestal for a waveguide;
    depositing a waveguide material comprising at least one of polymer or doped silica;
    depositing a resist material and removing unwanted excess to form pattern masks;
    etching said waveguide material to form waveguide precursors and removing said masks; and
    applying heat to reflow said waveguide precursors into near-circular cross-section waveguides that sit atop said pedestals, wherein said waveguide material naturally forms nearly circular cross sections due to surface tension effects, and after cooling, said waveguides will maintain said round shape.

2. The method of claim 1, wherein:
    in the steps of depositing and patterning a thin layer of wettable material, said pedestals are patterned to taper along their lengths on said surface of said substrate and provide for said waveguides to assume a conical taper after reflowing by heat.

3. The method of claim 1, wherein the waveguide material has a melting point lower than at least the substrate material and the thin layer of material.

4. A method for forming microminiature optical waveguides on the surface of a substrate, comprising the steps of:
    starting with a substrate material that a molten waveguide material will wet;
    covering said substrate with a layer of material that the molten waveguide material cannot wet;
    depositing a layer of material that the molten waveguide material will wet and patterning to form a pedestal along a desired surface-contact path for a waveguide;
    depositing a waveguide material comprising at least one of polymer or doped silica;
    depositing a resist material and removing unwanted excess to form pattern masks;
    etching said waveguide material to form waveguide precursors and removing said masks; and
    applying heat to reflow said waveguide precursors into near-circular cross-section waveguides that sit atop said pedestals, wherein said waveguide material naturally forms nearly circular cross sections due to surface tension effects, and after cooling, said waveguides will maintain said round shape.

5. The method of claim 4, wherein:
    in the step of depositing a thin layer of wettable material, said pedestals are patterned to taper along their lengths on said surface of said substrate and provide for said waveguides to assume a conical taper after reflowing by heat.

6. The method of claim 4, wherein the waveguide material has a melting point lower than at least the layer of material that the molten waveguide material cannot wet.

7. A method for manufacturing low-cost, nearly circular cross section waveguides, the method comprising the steps of:
    starting with a substrate material that a waveguide material will wet;
    depositing a layer of waveguide material comprising at least one of polymer or doped silica;
    depositing a resist and patterning it into a set of masks that extend along surface paths where waveguides are desired, and patterning said waveguide material such that portions of said waveguide layer that were not protected by said masks are etched away;
    removing said masks and exposing a set of waveguide precursors;
    using said waveguide precursors as masks while etching troughs in said substrate to form a trenched substrate, wherein such etch is allowed to eat away at said substrate itself for a predetermined amount of time to undercut said substrate from beneath said waveguide precursors;

heating to reflow said waveguide precursors into near-circular cross-section waveguides that sit atop said pedestals, wherein said waveguide material forms nearly circular cross sections due to surface tension effects; and cooling said waveguides to harden them so that they can maintain said rounded shape.

8. The method of claim 7, wherein:

holding said substrate upside down during the heating to reflow said waveguide precursors to prevent a molten waveguide precursor from flowing over the entirety of said substrate surface.

9. The method of claim 7, additionally including:

depositing a thin layer of non-wettable material prior to depositing the waveguide material, said pedestals are patterned to taper along their lengths on said surface of said substrate and provide for said waveguides to assume a conical taper after reflowing by heat.

10. The method of claim 7, wherein the waveguide material has a melting point lower than at least the substrate material.

11. A method for fabricating circular cross section waveguides and ball lenses on substrates, comprising the steps of:

applying a set of masks on a substrate to define an ultimate location for a corresponding set of waveguides;

etching the substrate down to form a pattern of pedestals, wherein the height and surface dimensions of said pedestals are independently controlled by photolithography and etching;

removing the masks and attaching a layer of waveguide material by anodic or thermal bonding, or by using an adhesive;

applying a mask to the top surface of said waveguide material and etching away unwanted waveguide material to leave a plurality of voids; and removing said masks and reflowing the remaining waveguide material to form a plurality of nearly circular cross section waveguides or ball lenses, wherein said waveguides or ball lenses self-align to said pedestals during the heat of reflow.

12. The method of claim 11, wherein the waveguide material has a melting point lower than at least the pedestals.

13. A method for fabricating ball lenses and waveguides on substrates, comprising the steps of:

starting with a wettable substrate;

applying a coat of non-wettable material to said substrate:

applying a pattern of masks and etching the non-wettable material coat;

removing said masks and leaving a patterned non-wettable material that will define an ultimate routing of a waveguide;

applying a waveguide material layer;

applying a pattern of masks on said waveguide material layer;

etching away the waveguide material not protected by said masks to leave a waveguide precursor after said masks are washed away; and reflowing said waveguide precursors to form circular cross section waveguides or ball lenses.

14. The method of claim 13, wherein the waveguide material has a melting point lower than at least the substrate and the non-wettable material.

* * * * *